ADDRESS SELECTION AND WRITE-IN CIRCUITS

INVENTOR.
HUGH ST. L. DANNATT
BY
Louis Altman
ATTORNEY

Oct. 17, 1967 H. ST. L. DANNATT 3,348,206

RELAY STORAGE UNITS

Filed Sept. 25, 1963 5 Sheets-Sheet 2

INVENTOR.
HUGH ST. L. DANNATT

BY

Louis Altman
ATTORNEY

Oct. 17, 1967 H. ST. L. DANNATT 3,348,206
RELAY STORAGE UNITS
Filed Sept. 25, 1963 5 Sheets-Sheet 3

INVENTOR.
HUGH ST. L. DANNATT
BY
Louis Altman
ATTORNEY

INVENTOR.
HUGH ST. L. DANNATT
BY
Louis Altman
ATTORNEY

VERIFICATION CIRCUITS

INVENTOR.
HUGH ST. L. DANNATT
BY Louis Altman
ATTORNEY

United States Patent Office 3,348,206
Patented Oct. 17, 1967

3,348,206
RELAY STORAGE UNITS

Hugh St. L. Dannatt, Rowayton, Conn., assignor to Sperry Rand Corporation, New York, N.Y., a corporation of Delaware Filed Sept. 25, 1963, Ser. No. 311,380
9 Claims. (Cl. 340—172.5)

This invention relates to a memory for data-processing equipment.

In some data-processing applications, it is advantageous to use mechanical or electromechanical switching components. Electronic and electromagnetic switches such as transistors, tunnel diodes and magnetic cores are faster, but relays are fast enough for certain applications and are usually more economical. In particular, the modern glass-encapsulated magnetic reed switch relay is capable of fairly rapid switching, and is reliable, compact, and economically priced. In general it is an object of this invention to provide a memory which takes advantage of the capabilities and economies offered by this type of relay.

The memory proposed herein is of the type in which a switching input causes a reed relay to close its contacts and thus draw current through a holding coil, which then latches the relay in the conducting condition to store the input. In this type of memory it is a problem to find a satisfactory method of non-destructive read-out. In one type of arrangement, in order not to disturb the latched reed switch which conducts its own holding current, another reed switch is located at the same memory address and is latched by the same holding flux but does not conduct the holding current. Accordingly, circuit continuity of the second switch can be determined without disturbing the holding circuit. However, such duplication of reed switches adds to the expense and bulk of the memory.

Another method is to check for continuity by probing with a commutator. This method is non-destructive and does not involve duplication of reed switches. It is, however, limited to sequential (i.e., bit serial) read-out. Moreover, it introduces additional mechanical commutating equipment into the memory, with its attendant problems of complexity, wear, and speed limitations. Electrical complications are also introduced because of the fact that read-out cannot be performed in the same manner and over the same address lines as the write-in function. Therefore, additional memory access lines are required just for read-out.

Accordingly, an object of this invention is the provision of a low cost, compact, non-destructive memory capable of bit-parallel read-out.

Another object is to provide a magnetic reed relay memory which avoids multiplication of components.

Another object is to provide a magnetic reed relay memory which does not require separate access lines or a different addressing method for read-out.

Another object is to provide a low-cost memory which is capable of performing a verification operation.

Another object is to provide an improved relay memory which is capable of relatively high speed, and which is inexpensive, reliable and compact.

In summary, this invention comprises a memory in which the bit storage unit is a magnetic reed switch relay. The relay solenoid comprises three coils: a pair of row and column selection coils for coincident write-in, and a latch coil connected in series with the reed switch. The coils are wound in inductive relationship with each other. Consequently, on read-out a non-destructive pulse may be injected into the latch coil and read out on one of the address coils, or injected into one of the address coils and read out on the latch coil, provided the reed switch is closed to complete the latch coil circuit. An output pulse then indicates a stored bit, i.e. a closed switch. If the switch is open, i.e. if no bit is stored, then no pulse is read out. This read-out system does not require an additional reed switch at each address, it is non-destructive, and it interrogates the memory over the same access lines and by means of the same addressing system as is used for the write-in function. Moreover, as will subsequently be explained, this memory can be designed to function in a sequential or parallel (i.e. bit serial or bit parallel) read-out mode, and is also capable of verification.

The invention thus summarized will now be explained in detail in connection with the accompanying drawings, in which.

Figure 5:
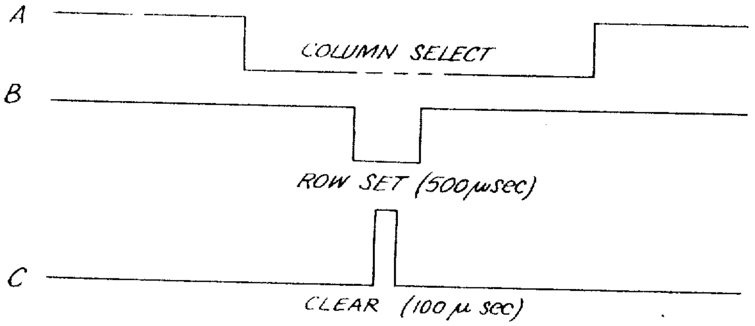
Figure 3A:
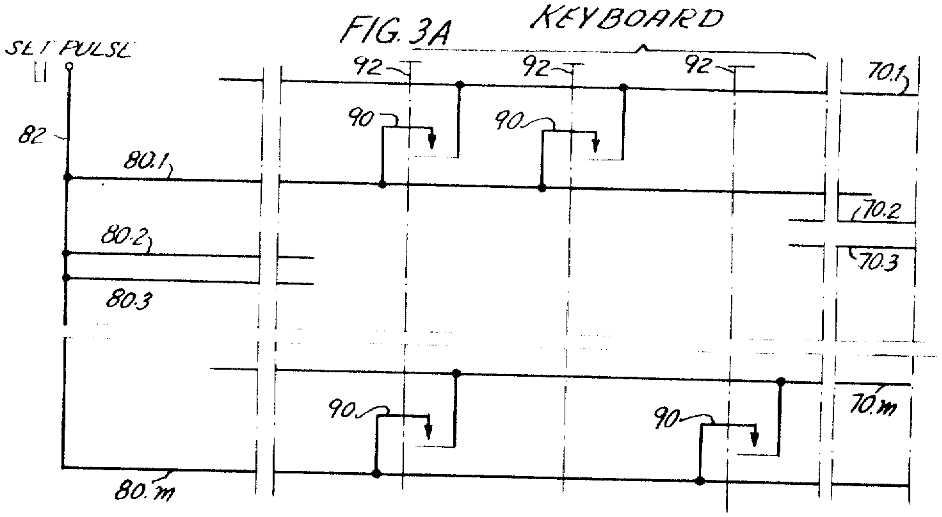
Figure 4:
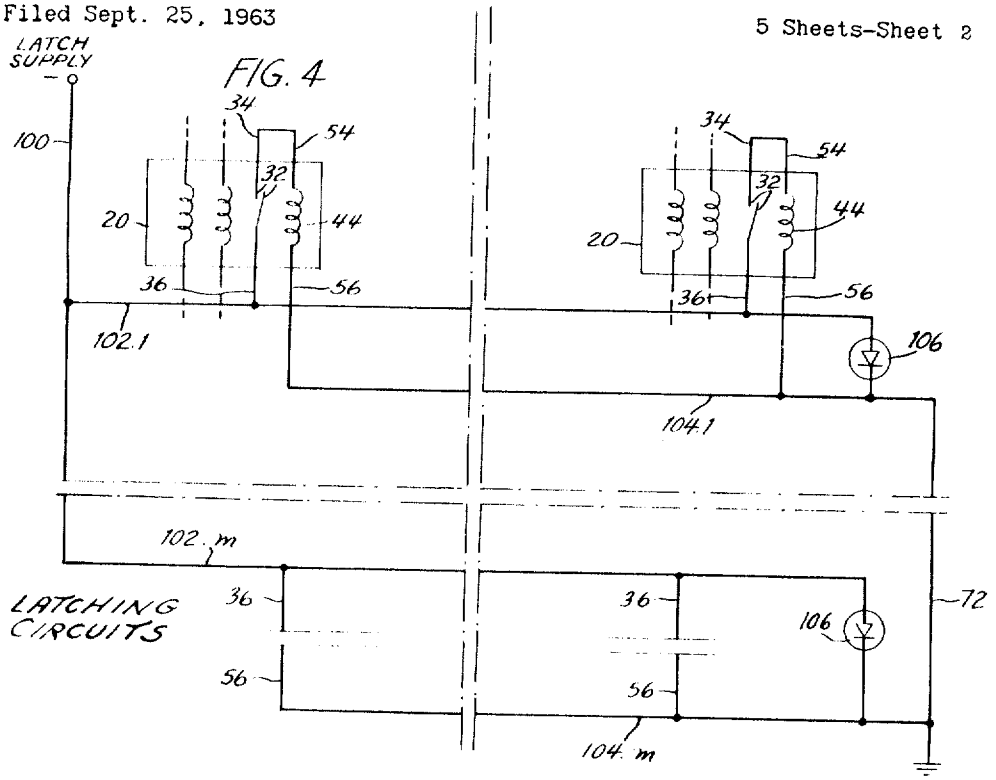
Figure 3B:
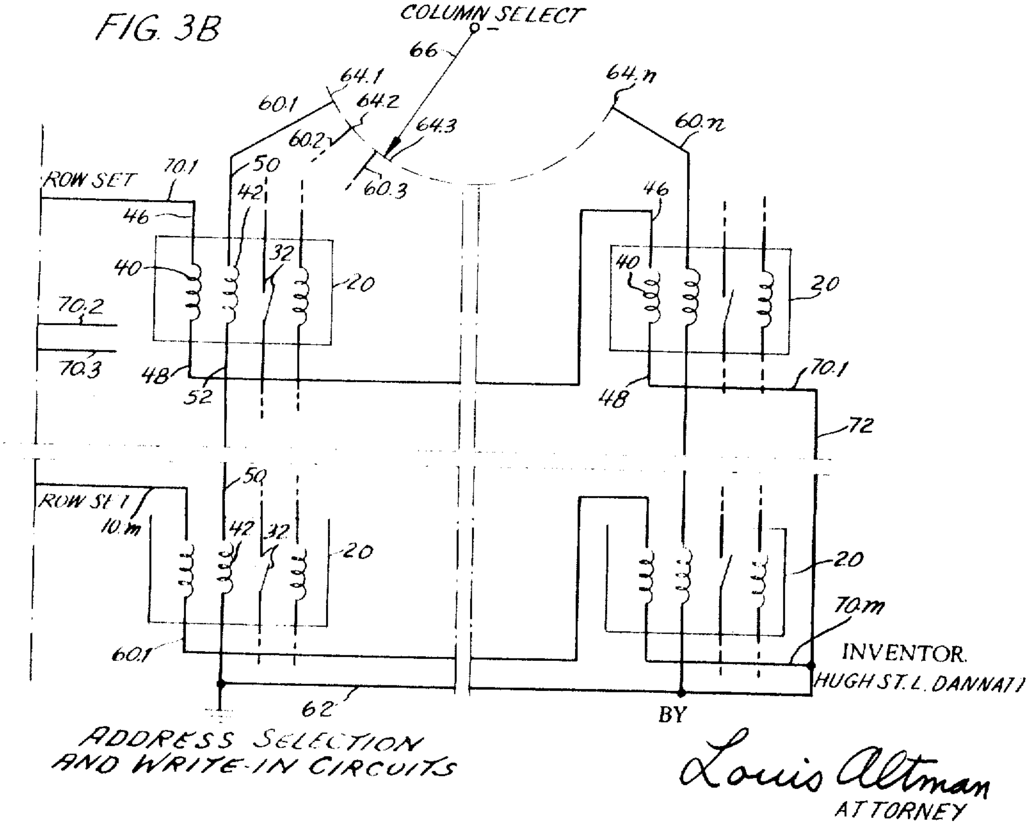
Figure 6:
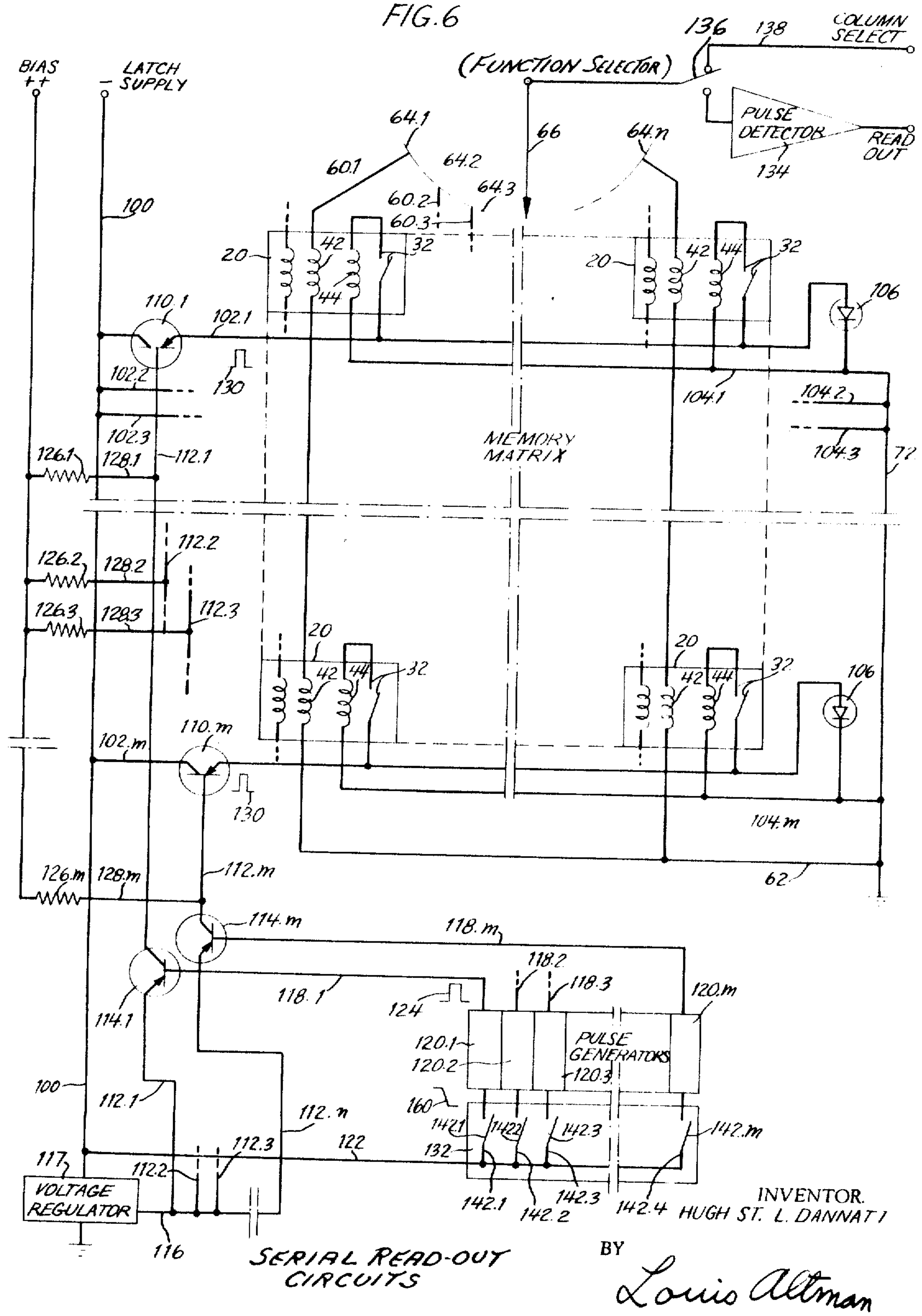
Figure 8:
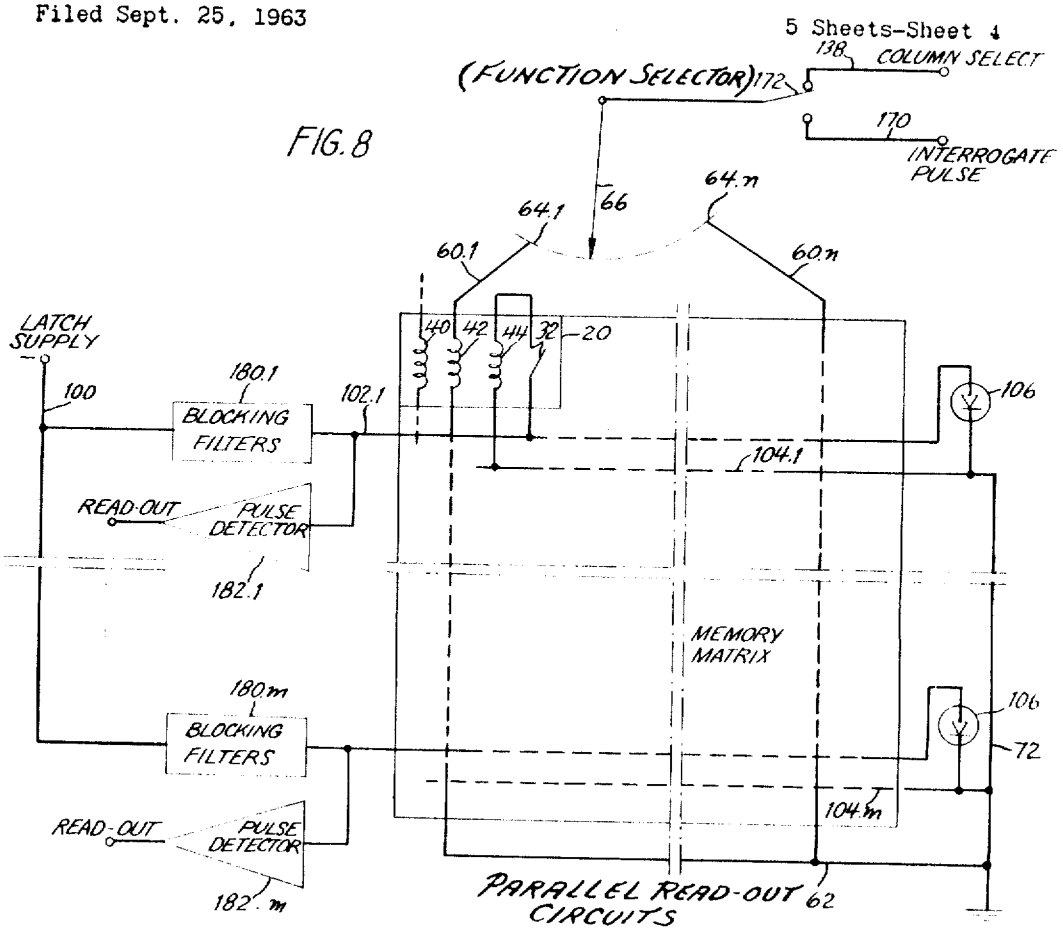
Figure 7:
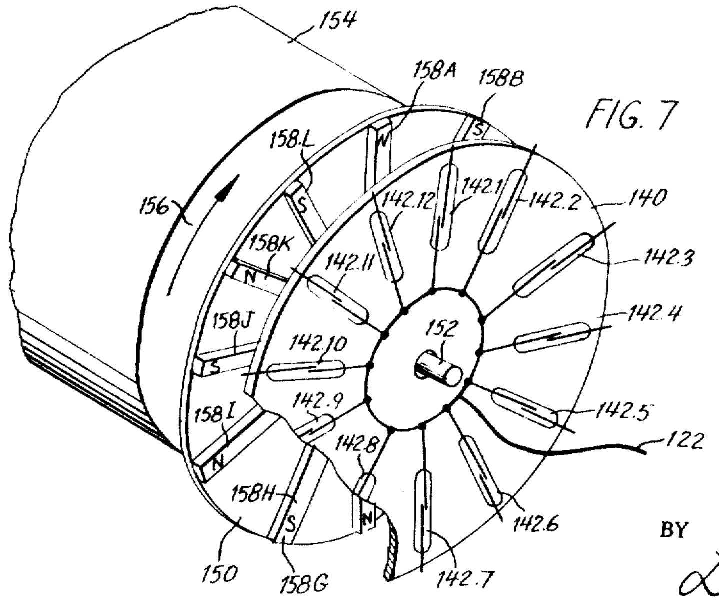
Figure 9:
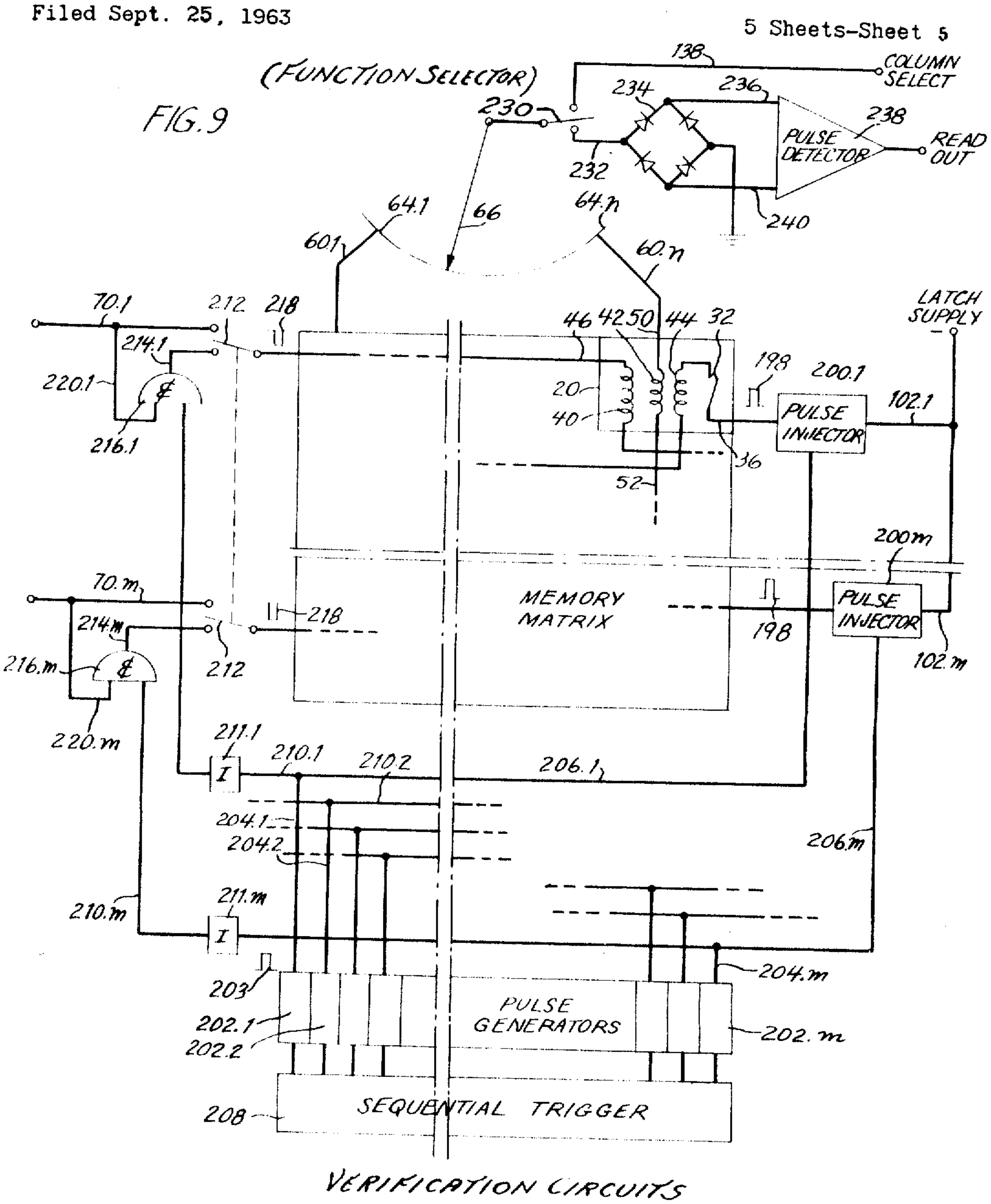

FIGURE 3, parts A and B, is a schematic diagram of the basic address-selection and write-in circuitry of a memory in accordance with this invention, employing relays of the type shown in the preceding figures;

FIGURE 4 is a schematic diagram of the basic latching circuitry of the memory of the preceding figures;

FIGURE 5 illustrates the pulse waveforms used in writing in and clearing information from the aforesaid memory;

FIGURE 6 is a schematic and block diagram of a sequential (i.e. bit serial) type of read-out circuit to be employed in the basic memory of FIGURES 3B and 4;

FIGURE 7 is a perspective view, with parts broken away for clarity of illustration, of a type of sequential trigger for use in the circuit of FIGURE 6;

FIGURE 8 is a schematic and block diagram of an alternative type of read-out circuit to be employed in the memory of FIGURES 3B and 4, this one operating in the bit parallel mode; and FIGURE 9 is a schematic diagram of a verification circuit to be employed in the memory of FIGURES 3B and 4.

*Basic memory matrix*

Figure 1:
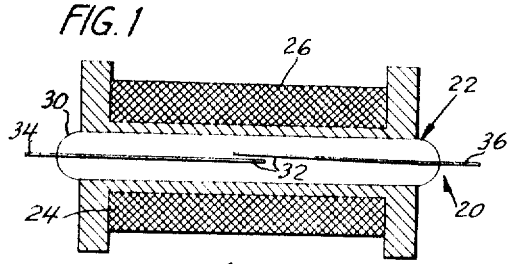
FIGURE 1 is a sectional view illustrating structural aspects of a basic bit storage relay according to this invention.

FIGURE 1 shows a magnetic reed switch 22 of the well known type comprising a sealed glass capsule 30 and a pair of slender, flexible steel reeds 32 extending axially of the glass capsule. Although this type of switch is familiar, a brief review of its characteristics will aid in understanding the way those characteristics are employed in the present invention. The reeds 32 are secured at opposite ends of the capsule 30 by being sealed in the glass. A short stub of each reed projects beyond the capsule 30 to provide a pair of terminals 34 and 36 for electrical connection. The two reeds 32 constitute the switch contacts, and are arranged so that they overlap but normally do not touch in the center of the capsule. This is the open condition of the switch. The steel of which the reeds are manufactured is ferromagnetic as well as conductive so that they can function as magnetic armatures. The switch is closed by providing a flux which extends axially along the switch. The reeds 32 conduct this flux and tend to be snapped together by the resulting magnetic forces. This switching occurs very rapidly due to the low mass and high flexibility of the reeds 32. When the reeds touch, they complete a circuit between the terminals 34 and 36. This is the closed or conducting condition of the switch.

In addition to rapid switching, this type of switch 22 has the advantage of a sealed construction in which the glass capsule 30 keeps out dust, dirt, and other contaminants, and also provides a controlled atmosphere in which the reeds 32 operate. Another useful feature of this type of switch is that it can be operated by any source of the requisite axially directed magnetic field. A permanent magnet brought into proximity, with its opposite poles at opposite ends of the switch, is sufficient. Another expedient is to wind an electrical coil cylindrically about the switch so that when energized it generates a magnetic field directed along the longitudinal axis. This invention makes use of both the permanent magnet approach and the electrical coil approach. The magnetic reeds 32 are normally made of a low retentivity material, and thus the contacts open readily when the magnetic field is removed.

Figure 1A:
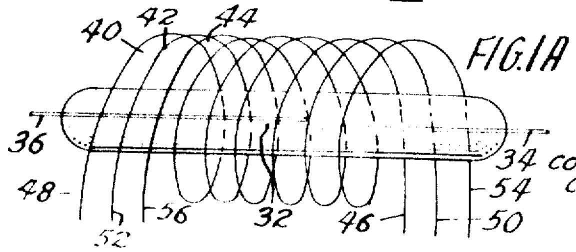
FIGURE 1A is a schematic illustration of the basic bit storage relay.

FIGURE 1 shows a relay 20 in which the magnetic reed switch 22 extends axially through the center of a flanged cylindrical coil form 24. In accordance with this invention, a multiple solenoid 26 is wound about the coil form 24. This comprises three electrically independent coils, preferably wound in stranded fashion as shown in FIGURE 1A. The term stranded is used in this specification and the appended claims to mean the method of winding a multiple coil in which the respective coil wires are bunched together and then wound together about the coil form. For example, in manufacturing the relay 20 of this invention, three separate wires are gathered as though they were one strand, and that multiple strand is then wound about the coil form 24 to form the multiple solenoid 26. The advantages of this stranded method of construction are first, that each of the three coils are distributed uniformly along the axial length of the magnetic reed switch 22, and second, there is strong and uniform inductive coupling between any two of the coil windings, which has advantages for the purposes of readout as will be explained below. It should also be noted that this stranded construction greatly increases the interwinding capacitance, a fact which must be taken into account in designing the memory read-out circuitry which will be described.

Figure 2:
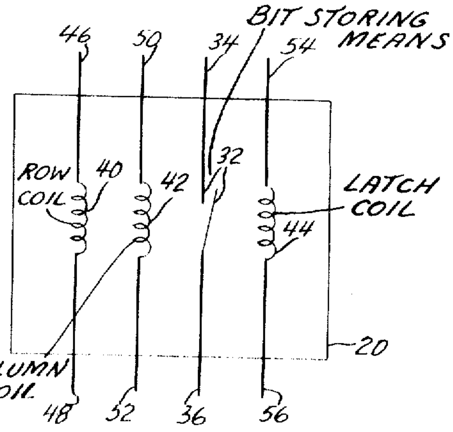
FIGURE 2 is a schematic diagram illustrating the electrical configuration of the relay of FIGURE 1.

FIGURE 2 shows the electrical configuration of the magnetic reed switch relay 20. First, there are the switch contacts 32 and their associated terminals 34 and 36 accessible from outside the relay 20. The three coils 40, 42, and 44 are seen to be electrically independent although they are physically intermingled in the winding 26 of FIGURE 1. These coils 40, 42 and 44 are seen to have pairs of externally accessible terminals 46 and 48, 50 and 52, 54 and 56, respectively. The terminals 46, 50, 54 are all physically located at the same end of the windings and at the same side of the relay as the switch terminal 34. The coil terminals 48, 52, and 56 and the switch terminal 36 are all at the other end of the windings and the other side of the relay.

FIGURE 3B shows a plurality of magnetic reed switch relays 20 connected to form a rectangular coordinate memory array. The relays 20 are arranged in *m* horizontal rows and *n* vertical columns. In this and other figures, only the first and last relays 20 in a row and column are shown. The remaining relays in the intervening columns and rows of the matrix are omitted for clarity of illustration, the missing electrical connections being indicated by dotted lines.

Address selection in this memory is by the coincident current method. A set of column busses 60.1 to 60.*n* are connected in series with the column address coils 42 of all the relays 20 of the respective columns 1 to *n*. For example, the select bus 60.1 for the first column is connected to the upper terminal 50 of the column address coil 42 of the relay 20 at the intersection of the first column and first row. The circuit then proceeds from the lower terminal 52 of that address coil 42 and on in a similar manner in series through the terminal 50, address coil 42, and terminal 52 of every other relay 20 in the first column. After emerging at the foot of the first column, the select bus 60.1 is connected to a ground bus 62. The column select busses 60 of the other columns are similarly connected, for example the column select bus 60.*n* of the *n*th column. By means of the column select busses 60, a half-write current can be applied to all the relays 20 of any particular column. In order to select the desired column, a commutator is provided having segments 64.1 to 64.*n* to which the respective 1st through *n*th column select busses are connected. A negative potential may be applied to a rotating arm 66 of the commutator which selects the segment corresponding to the desired column bus 60.

The row address coils 40 of all relays 20 of a given row are connected in series with the appropriate row set bus 70.1 to 70.*m* for each row in the memory matrix. As an example, the select bus 70.1 for the first row is connected to the upper terminal 46 of the row address coil 40 of the relay 20 in the first row and first column. Emerging from the lower terminal 48, the circuit then proceeds across the entire first row by way of the terminal 46, coil 40, and terminal 48 of each relay 20 in the row. At the right hand side of the matrix as seen in FIGURE 3B the row set bus 70.1 is connected to a ground bus 72. The other row busses are similarly connected, as for example bus 70.*m*. Thus, another half-write current can be applied to any selected row by means of the busses 70.1 to 70.*m*.

The coincidence of the two half-write currents, one along the desired column and the other along the desired row, uniquely selects the particular relay 20 at the desired memory address. Each half-write current generates at least half but less than all the flux necessary to switch the relay, and two half-fields of the same polarity combine to make a full write-in input which closes the reed switch contacts 32. The contacts are then latched closed to retain the selected relay 20 in the conducting condition, by means of a latching circuit which will be described below. If write-in pulses of the same polarity, e.g. negative, are applied to the row and column set inputs, the illustrated terminal connections, together with the fact that all the windings 40, 42 and 44 are automatically wound in the same sense by virtue of the stranded construction, assure that the half-write fluxes of the address coils 40 and 42 will be in the same direction and thus aid each other.

The row set inputs may be applied to the busses 70.1 to 70.*m* in serial or parallel manner. In the case of parallel operation, any conventional source of an encoded input can be employed to distribute set pulses among the row busses 70.1 to 70.*m* in the desired pattern. For example, the input to the circuit of FIGURE 3B may be the encoded output of a conventional tabulating-card-reader. Or the input may, if desired, come from a manual keyboard-operated ganged-contact encoder of the kind illustrated in FIGURE 3A. In this encoder, the row set busses 70.1 to 70.*m* are connectable through individual row encoding leads 80.1 to 80.*m* to a common supply bus 82 to which an appropriate negative set pulse is applied. The connections between various pairs of busses 70 and encoding leads 80 are made by closing normally open contacts 90 operated by the keys of a keyboard, schematically represented by the lines 92. These lines indicate that each key has ganged therewith one or more contacts 90 connected to various rows according to the code symbol for the character represented by the particular key 92. Thus for any key which is depressed, set pulses are applied in parallel to the appropriate coded combination of row busses 70.1 to 70.*m*. Alternatively, if serial operation is desired any type of commutator or other conventional form of serially stepped switch would be satisfactory for selecting successive row set busses 70.

FIGURE 4 shows the latch supply circuit of the same memory array. Here, too, taking into account the common winding direction of the stranded coils 40, 42 and 44, the illustrated polarities and terminal connections are such that the latching flux of the coils 44 is in a direction to aid the pull-in flux of the address coils 40 and 42. The negative latch supply potential is applied to a bus 100 serving the entire memory array. From the bus 100 the latch circuit proceeds along parallel paths provided by row supply busses 102.1 to 102.*m*. Each such row supply bus 102 is connected to all the lower switch terminals 36 of the relays 20 in its particular row. Looking at the first row it is seen that the upper switch terminal 34 of each relay is connected directly to the upper latch coil terminal 54 of the same relay to direct the latch supply circuit through the latch coil 44. The lower latch coil terminals 56 of all the relays in a given row are connected to the appropriate latch return busses 104.1 to 104.*m*, serving the 1st through *m*th rows of the matrix respectively. The busses 104 all return to the ground bus 72. Thus, within any one relay 20 the switch contacts 32 and the latch coil 44 are connected in series. These series latch circuits of all the respective relays in a given row are then connected in parallel with each other across the supply bus 102 and the return bus 104 for that particular row, as best seen from the way the circuit for the *m*th row is drawn. Moreover, since the latch circuits of the respective rows are all in parallel across the busses 100 and 72, the latch coil circuit of each relay 20 can be energized independently of all the other relays in the matrix. A back-poled diode 106 is shunted across each pair of busses 102 and 104 to short circuit the inductive kickback voltages generated by the latch coils 44 when their respective contacts 32 are opened upon clearing of a stored bit.

At this point it would be helpful to direct attention to the waveforms used for setting and clearing the reed switch relays 20. In FIGURE 5 waveform A shows the time variation of the column select input voltage applied to the commutator arm 66 of FIGURE 3B. The column select potential may be maintained at a steady negative level for an indefinite time, during which various serial or parallel row selections are made, as for example, by means of the encoder of FIGURE 3A. FIGURE 5, waveform B, shows an individual row set pulse which may be applied to the encoder set pulse bus 82 in FIGURE 3A if parallel selection is employed, or to a row selection commutator in the case of serial selection. In a practical embodiment, this pulse may be of approximately 500 microsecond duration and an amplitude suitable for the particular reed relay used.

Information written into the memory may be cleared in various different ways. One possibility is to interrupt the latch coil current supply (FIGURE 4), or at least to reduce the latch supply current below the contact drop-out level for a sufficient time to allow the contacts 32 to separate. This method is suitable for clearing the entire matrix in one operation. For selective clearing of a single row or column, a clear pulse of the type shown in FIGURE 5C is injected along the appropriate row bus 70 or column bus 60. The pulse is shown as a positive one, since it must be of a polarity to oppose the magnetic field of the latch coil 44. For reliability, the clear pulse amplitude should be approximately five times the amplitude of the column select and row set pulses. The clear pulse duration, however, need only be about one hundred microseconds, since it is characteristic of self-holding relays that on re-opening it is only necessary to interrupt the holding current, whereupon the holding flux collapses and the contacts, thereafter separate of their own accord. It is important to note, however, that if the clear pulse is made much shorter than one hundred microseconds, then even a fairly large pulse amplitude will not develop a sufficient voltage-time product to separate the relay contacts 32. This effect is depended upon for the read-out operations described below.

*Sequential read-out system*

One type of read-out circuit in accordance with this invention is shown in FIGURE 6. Here the connections of the row address coils 40 (FIGURE 3B) are omitted for clarity, and the column set coil 42 and latch coil 44 of each relay 20 are shown as the primary and secondary windings respectively of a transformer. This relationship between the coils results from their being wound on a common coil form 24 (FIGURE 1), and the stranded type of winding arrangement provides good inductive coupling between them. From the previous discussion it will be recalled that the individual pairs of latch supply and return busses 102 and 104 are row-organized while the column address busses 60 (FIGURE 3B) are column-organized. Making use of this already available organization, the read-out system of FIGURE 6 interrogates a row of the matrix by injecting an interrogation pulse into the appropriate row latch supply bus 102, and whatever bits are stored are then read-out on the column address busses 60 of the appropriate columns. The particular system of FIGURE 6 provides serial read-out by scanning sequentially across the column and row positions. The commutator arm 66 is first set on the first commutator segment 64.1 to read the first column. Then a series of interrogation pulses is injected in sequence into the respective latch supply busses 102.1 to 102.*m* of the matrix rows. For non-destructive read-out, the pulse injector circuit of FIGURE 6 must cooperate with the latch supply circuit in a manner to avoid interfering with the latching function. This requirement means that the pulse injector must not significantly interfere with the flow of latching current whenever one or more relays may have bits stored therein. Two types of pulse injection into the latch supply are possible: the latch current may be momentarily raised above the normal holding level, which is inherently non-destructive; or the latch current may be momentarily cut off or dropped below the normal holding level. In the circuit of FIGURE 6, the interrupting approach is taken, with due precaution to assure that the interruption is too short to disturb a closed pair of contacts 32 so that the read-out is not destructive. The reason for this approach is one of economy, since the capability of momentarily raising the latch current level entails additional power supply capacity and additional components, whereas the interrupting approach results in simpler circuitry which can be conveniently combined with a voltage regulation circuit as described below.

One way of interrupting as well as regulating the latch supply is by routing the circuits of the latch supply busses 102.1 to 102.*m* through the collector-emitter paths of respective control transistors 110.1 to 110.*m*. These transistors can both block the latch current entirely for pulse injection purposes and control it gradually for voltage regulation purposes. So long as the control transistors 110 remain conducting, the latch supply is available to any relay storing a bit. These transistors are normally maintained in a conducting state by a negative bias applied to their base electrodes along individual leads 112.1 to 112.*m*. These leads in turn are routed through the collector-emitter circuits of respective pulse transistors 114.1 to 114.*m*, to a common base bias lead 116 which draws the required negative bias by being connected through a voltage-regulator 117 to the negative power bus 100. (The voltage regulator 117 will be more fully discussed later on.) Thus as long as the pulse transistors 114 are maintained in a conducting state the necessary base bias is available ot the control transistors 110 for latch current to flow. The pulse transistors 114.1 to 114.*m* are normally kept in this conducting condition by a negative bias applied to their base electrodes along individual leads 118.1 to 118.*m*. These leads draw their negative bias by being connected through respective pulse generators 120.1 to 120.*m* to a common base bias lead 122 which returns to the negative power bus 100.

In order to inject an interrogation pulse into a particular row latch supply circuit, the appropriate pulse generator 120 momentarily blocks the negative bias drawn from the lead 122 by its associated lead 118 and drives that lead 118 strongly positive, as shown by the pulse 124. This drives the base of the associated pulse transistor 114 positive, cutting off that transistor and thereby blocking the bias along one of the leads 112 to the associated control transistor 110. A common source of high positive bias is connected through respective resistors 126.1 to **126.*m* and respective leads 128.1 to 128.*m* to the respective control transistor base leads 112.1 to 112.*m* at a point between their associated transistors 110 and 114. The value of the resistors 126 exceeds the low emitter-to-collector impedance of the pulse transistors 114 when the latter are in the low-impedance or conducting state. This normally clamps the base electrodes of the control transistors 110 near the negative potential of the bus 100. When one of the pulse transistors 114 is cut off as just described, however, its emitter-to-collector impedance exceeds the associated resistance 126 and the base of the associated control transistor 110 is therefore driven strongly toward the high positive bias potential on the associated lead 128, thus cutting off that control transistor 110 and blocking the latch supply along one of the busses 102 to the associated memory row. This interruption of the negative supply on a row latch bus 102 is pictured as the injection of a positive interrogation pulse 130** into the latch supply circuit.

The pulses 124 and 130, however, are of short duration and quickly drop off to allow the interrupted latch current to flow again before the switch contacts 32 can open and destroy the stored bit. Reliable non-destructive read out has been achieved with interrogation pulses 130 having a voltage amplitude not greater than five times the voltage necessary to latch the relay, i.e. not greater than ten times the amplitude of either of the half-write pulses in FIGURE 5, waveforms A and B, and a duration in the neighborhood of ten to twenty microseconds, which is quite substantially shorter than the clear pulse (FIGURE 5, waveform C) of one hundred microseconds.

The pulse generators 120.1 to **120.*m* block the leads 118 in response to a sequential trigger 132 comprising normally open switches 142.1 to 142.*m* which close momentarily in that sequence. These switches all draw the negative triggering input from the negative power bus 100 through the common lead 122, and as they close they apply this input in turn to trigger the associated pulse generators 120.1 to 120.*m* in that sequence to inject successive interrogation pulses into memory rows 1 to *m* in that order. After the sequential trigger 132 has thus scanned all the row positions 1 to *m* of the first column, the commutator arm 66 may then be stepped successively across the commutator segments 64.1 to 64.*n* to scan the row positions of all the columns 1 to *n*** in a similar manner.

The sequential trigger 132 may be any conventional type of mechanism employing electronic or mechanical switching as desired, for example a commutator, a stepping switch, or a regularly pulsed ring counter. For an inexpensive low speed electromechanical relay memory of the present type, a mechanical switching arrangement is often the cheapest expedient and is capable of adequate speed. FIGURE 7 shows a particular example of a recirculating mechanical scanning switch suitable for use as the sequential trigger 132 in the circuit of FIGURE 6. This comprises a stationary disc 140 upon which is mounted a plurality of magnetic reed switches 142 (FIGURES 6 and 7) of the type discussed above in connection with the relays 20. A total of *m* switches is employed, one for each row of the memory matrix. In the specific example of FIGURE 7, *m* equals 12. The common supply lead 122 terminates in a circular bus near the center of the stationary disc 140, to which an inner terminal of each magnetic reed switch 142 is connected. The outer terminals of the reed switches 142 are connected individually to their respective pulse generators 120.1 to **120.*m* (FIGURE 6). A second disc 150 is mounted parallel to and closely adjacent the stationary disc 140. The disc 150 is mounted on a rotatable shaft 152, seen protruding through a central opening in the stationary disc 140. The shaft 152 is driven by a motor 154 in the direction indicated by arrow 156. The moving disc 150 bears a plurality of permanent magnets 158 which serve to switch on the magnetc reed switches 142** momentarily as they pass.

It would be possible to provide just one permanent magnet 158 and to space the magnetic reed switches 142 equally about the stationary disc 140. Such an arrangement would close the switches 142 in sequence once each for every revolution of the disc 150. But instead of this, in order to allow either a faster scanning rate or a lower motor speed, a vernier arrangement is employed. Permanent magnets 158 A to L, equal in number to the reed switches 142, are evenly spaced about the rotating disc 150. The magnetic reed switches 142, however, are spaced at increasing angular increments about the stationary disc 140. Starting with the first switch 142.1 and going clockwise about the disc 140 as seen in FIGURE 7, the smallest angular displacement is between the first pair of adjacent switches 142.1 and 142.2, and even this smallest space exceeds the angular displacement between any two adjacent magnets 158. A still larger space appears between the next pair of adjacent switches 142.2 and 142.3, and so on until the largest space appears between the latest pair of adjacent switches 142.11 and 142.12. As the disc 150 turns, within the time required for the first magnet 158A to traverse the space between switches 142.1 and 142.2 the following sequence of events occurs: At the start of the cycle, the first magnet 158A momentarily closes the first switch 142.1. A small further displacement of the disc 150 then brings the second magnet 158B into position to momentarily close the second switch 142.2, and so on in sequence around the circle until the last magnet 158L momentarily closes the last switch 142.12. Next the last magnet 158L crosses the small remaining space and again closes the first switch 142.1. With the reactivation of this switch, the scanning sequence starts again, with switches 142.1 to 142.12 again being activated in that order but this time by respective magnets 158L, 158A, 158B . . . 158M in that order. At the end of each cycle, the role of starter of the cycle regresses to the next preceding magnet 158 in order. When *m* (i.e. twelve) scans have been performed, then a full revolution of the magnet disc 150 has been completed and the described cycle of scans is repeated. Thus the vernier arrangement achieves *m* scans per disc revolution instead of only one. This system has been found to provide quite sharp on-off characteristics and cleanly separated closures of consecutive switches 142, provided any two consecutive magnets 158 are placed in head-to-tail relationship with respect to their north and south poles, as indicated by the N and S markings thereon. The reed switches 142 close without regard to the polarity of the actuating magnets.

The pulse generators 120 of FIGURE 6 must be capable of responding to the poorly shaped negative-going input (see waveform 160) provided upon closure of the trigger switches 142, to produce the well-shaped output pulse 124. Such a circuit may be found in FIGURE 6–0.15, A Handbook of Selected Semiconductor Circuits, NAVSHIPS 93484, pp. 6–18, which is available from the United States Government Printing Office.

To understand how an interrogation pulse injected into the latch coil 44 is picked up by the column address coils 42, recall that all the relay coils are wound in a stranded fashion. Therefore, any two of the coils are in an excellent inductive relationship with each other. As a result, any pulse injected into one of the coils of a relay 20 is efficiently coupled by transformer action into each of the other coils of that relay. Moreover, the good inductive coupling keeps leakage flux to a minimum and thereby reduces cross-talk between relays 20. These are some of the advantages, in addition to ease and economy of construction, of the stranded manufacturing method.

Discriminating between relays 20 which are or are not storing bits is accomplished by virtue of the fact that an open set of switches contacts 32 (no bit stored) in a relay 20 will not allow injection of the interrogation pulse 130 into the latch coil 44 of that relay. Therefore, no output pulse will be coupled into the column address coils 42. The lack of an output pulse on the associated column bus 60 indicates the no-bit-stored condition of the relay at the particular column position in the row then being interrogated. If the contacts 32 are closed (bit stored) this allows the interrogation pulse 130 to be injected into the latch coil 44 and then coupled inductively into the address coils 42 and read out on the column bus 60 as a storage indication.

It will be recalled from the discussion of FIGURE 4 that a series combination of the contacts 32 and latch coil 44 of each relay 20 along a given row is in parallel with the corresponding circuit of every other relay 20 of the same row. Therefore, the interrogation pulse applied to a particular row bus 102 will be injected into the latch coil 44 of each relay 20 which has a bit stored therein, independently of other relays of the row which may or may not have bits stored therein.

In a memory having a read-out system in accordance with this embodiment of the invention, it is important to inject the interrogation pulse into the low-capitance side of the circuit (i.e. bus 102) which is adjacent the relay contacts 32, and not into the high-capitance side of the circuit (i.e. bus 104) which is adjacent the latch coil 44. At first glance, it might seem that this would not make any difference, since the relay contacts 32 are in series with their respective latch coils 44 and thus would govern circuit continuity in any case. However, the stranded winding method not only produces excellent inductive coupling among the relay coils 40, 42, 44, but it also results in a high degree of inter-winding capacitance between any two of these coils. Consequently, even with the contacts 32 open, if an interrogation pulse were injected into the circuit from the side adjacent the latch coil 44, that coil would capacitively couple a significant noise pulse into the column address coil 42. Thus, there would be difficulty in distinguishing between open and closed contacts. When the pulse is injected into the circuit from the side adjacent the contacts 32, however, the low capacitance of the open contacts provides sufficient isolation.

In order to detect the output pulse induced in the column address coil 42, which indicates a bit stored, a pulse detector 134 is provided. This detector, which is shown as a conventional amplifier, feeds its amplified output to a read-out terminal to which any desired type of utilization device may be connected. The utilization device must be provided with a running count of the row position of the trigger 132 and the column position of the commutator 66 as a means of identifying the address of each successive bit read out of the memory.

This is conveniently done by any conventional method of synchronizing the utilization device with the trigger 132 and commutator arm 66. For example, additional commutators for enabling the utilization device to keep track of the row and column coordinates may be ganged on common drive shafts with the trigger 132 (i.e. the shaft 152) and commutator arm 66 respectively, to achieve mechanical synchronization. In this case the unequal spacing of the reed switches 142 about the disc 140 would have to be taken into account. As an alternative, electronic synchronization may be employed by applying row and column signals, e.g. the sequential row pulses 124 and the sequential column outputs of a commutator ganged with the commutator 66, to a conventional logic matrix.

In order to switch the memory between the write-in and read-out functions, a double-throw function-selector switch 136 is provided which connects the commutator arm 66 either to the column select line 138 or to the pulse detector 134.

As an additional feature of the circuit of FIGURE 6, the control transistors 110 also serve to regulate the latch voltage on busses 102. Regulation is particularly important in the type of device being considered here, because at different times various different numbers of relays 20 will be drawing current from the latch supply, depending upon the number of bits then stored in the memory. Thus, the current drawn will vary widely, affecting the supply voltage on the power bus 100. To correct this, the voltage-regulator 117 is connected between the power bus 100 and ground, to sense the unregulated voltage on the power bus. The circuit 117 may be any conventional regulator such as the one in FIGURE 8–0.11 (A), pp. 8–17 of the aforementioned "Handbook." The output of the regulator 117 is a control signal along the lead 116, which varies the bias on the base leads 112 to control all the transistors 110. Thus a single voltage-regulator 117 serves the entire memory, making use of components and circuitry already present for other purposes.

*Parallel read-out system*

FIGURE 8 shows an alternative read-out system again employing pulse-injection and transformer coupling, but yielding bit parallel instead of bit serial read-out. In this embodiment the interrogation pulse is injected along one of the column busses 60, selected by means of the commutator 66, 64, and the outputs are sensed simultaneously on all of the latch lines 102 of those rows which have a bit stored at that column location. Even in the absence of a bit a noise output is capacitively coupled from the address coil 42 to the latch coil 44, but all outputs are taken through the low-capacitance relay contacts 32 which when open would isolate the noise outputs from the line 102. The interrogation pulse, which may be the output of any known type of pulse generator, is applied to a lead 170. In order to select between the write-in and read-out functions, a double-throw function-selector switch 172 connects the commutator arm 66 either to the column select line 138 or to the interrogation line 170. In the latter case, the applied pulse is connected through the commutator arm 66 and the appropriate commutator segment 64 and column bus 60 (e.g. 64.1 and 60.1) to the address coils 42 of an entire column (e.g. the first column). This pulse is then inductively coupled to the associated latch coils 44. Then in any relay 20 which is storing a bit (contacts 32 closed), the coupled pulse is applied to the associated row latch supply bus 102. Individual blocking filters 180.1 to **180.*m*, which may be conventional L-type low-pass filters, are inserted in the row latch busses 102.1 to 102.*m* respectively, to block the output pulses from the power supply and from the other row latch busses 102 while offering a low impedance to the D.C. latch supply. The output pulse is shunted instead to conventional pulse detectors such as amplifiers 182.1 to 182.*m*, one for each row. The amplified output of the pulse detectors is applied to respective read-out terminals, to which any desired individual utilization devices may be connected. A bit indication in the form of an output pulse appears simultaneously on the read-out terminals of each row in which the relay 20 at the first column position has a bit stored therein. Thus the entire first column is read out in parallel. Subsequently, the commutator arm 66 may be indexed for similar parallel read-outs from the other columns in succession. The utilization devices must be provided with a running indication of the position of the commutator 66**, as suggested above, as a means of identifying the particular column of origin of a bit indication sensed by one of the individual row utilization devices.

*Verification system*

FIGURE 9 shows another modification of the memory read-out circuitry, this one designed for verification. With this circuit, the information stored in the memory can be compared to another block of information which is stored elsewhere, e.g. on a tabulating card or on magnetic or punched paper tape or which is manually entered into a keyboard. The comparison is noted for each address in the memory, and a non-compare indication pinpoints the location of any discrepancy. In FIGURE 9, the relay 20 is drawn in a manner to show the row address coil 40 and the latch coil 44 as a pair of transformer primary windings, and the column address coil 42 as a single secondary winding in inductive relationship to both of the primaries 40 and 44. Summarizing the operation of this embodiment, simultaneous pulses are applied to the respective primary windings 40 and 44 of a relay 20, one pulse representing a bit stored in the relay and the other representing information to be compared therewith. If these pulses tend to induce equal and opposite output voltages in the secondary winding 42, then these voltages will cancel each other and there will be no net output. This is taken as an indication of a comparison, i.e. of the simultaneous occurrence of the bit-representing pulses. The simultaneous absence of bit pulses on the primary windings 40 and 44 will also result in no net output on the secondary winding 42, thus indicating a comparison of the absence of a bit. In either case, no output means there is no discrepancy. But if a bit pulse is applied to one of the primaries 40 and 44 and not to the other, the secondary 42 will have a net output induced therein and this output indicates a non-comparison, i.e. a bit present in one place but not the other. Thus a running scan of all the relays 20 can be made, and as long as no output appears it is known that the information is being successfully verified. When an output is produced for a particular relay 20, this reveals a discrepancy in the information corresponding to the memory address of that relay. Since the coils 40 are the row address coils and the latch coils 44 are also row-connected (see FIGURE 4), the verification pulses injected into these coils are applied to an entire row at a time and read out on a particular column address coil 42 and bus 60 to establish the address coordinates.

For the sake of clarity, the circuit of FIGURE 9 is largely indicated in block diagram form, and certain connections are omitted. For details of such connections refer to FIGURES 3B, 4 and 6. Verification pulses 198 are injected into the latch coils 44 by means of pulse-injectors 200.1 to **200.*m* inserted in the respective row latch supply busses 102.1 to 102.*m*. These pulse-injectors preferably include respective control transistors such as 110 and pulse transistors such as 114 connected as shown in FIGURE 6. The voltage-regulation arrangement for the latch supply is also preferably as shown in FIGURE 6. In addition, for the sake of non-destructive operation, if the latch-current-interrupting approach is employed, the verification pulses 198 must adhere to the amplitude and duration requirements mentioned in connection with the interrogation pulses 130 of FIGURE 6. The pulse-injectors 200.1 to 200.*m* are actuated by pulse generators 202.1 to 202.*m* respectively, which may be identical to the pulse generators 120 of FIGURE 6. The pulses 203 generated by the circuits 202.1 to 202.*m* are applied over combinations of leads 204.1 and 206.1 to 204.*m* and 206.*m*, respectively. In order to probe the memory rows 1 to *m* in that sequence, the pulse generators 202.1 to 202.*m* are fired in that order by a sequential trigger 208** which may be any type of device mentioned previously in connection with FIGURE 6, including the scanning switch of FIGURE 7.

The pulse generators 202.1 to **202.*m* also supply the verification pulses for the row address coils 40. The output pulses 203 of these generators are applied by the leads 204.1 to 204.*m* to the row address coils through respective leads 210.1 to 210.*m*, conventional inverters 211.1 to 211.*m*, "And" gates 216.1 to 216.*m*, and leads 214.1 to 214.*m* as inverted pulses 218 at the same time that they are sent to the latch coil pulse injectors 200 over the leads 206. In this way, the vertification pulses are applied to the row address coils 40 and latch coils 44** simultaneously. This inherent synchronization assures that the pulses will coincide to produce cancelling outputs.

The verification pulses 198 and 218 must be correlated with the respective blocks of data to be compared. A pulse

198 is injected into the latch coil 44 of one of the relays only in the event that the associated contacts 32 are closed, i.e. if the relay stores a bit. Thus the verification pulses 198 which reach or do not reach the latch coils 44 of the various memory relays 20 represent the respective bits or zeros stored in these relays. Once again, the problem of capacitive coupling requires the pulses 198 to be injected from the low-capacitance side of the circuit adjacent the switch contacts 32.

The pulses 218 applied to the row address coil leads 214 must similarly represent a block of information. This can be any encoded input, and may be conveniently applied to the appropriate row address busses 70 in the required code pattern. For example, a tabulating card or a magnetic or punched paper tape can be scanned by a conventional reader, and the encoded output applied, usually in bit parallel form, to the busses 70. Alternatively, the encoded input to the busses 70 may come from the keyboard-operated encoder of FIGURE 3A. In any case, the verification input is conveniently applied to the same busses 70 and in the same manner as any input such as the write-in which originally set up the stored data. During such an initial write-in operation, ganged double-throw function-selector switches 212 are moved to connect the row address coils 40 directly to the inputs on the respective row address busses 70. During subsequent verification, the switches 212 are moved instead to connect the row address coils 40 with respective verification input leads 214 which go to the respective "And" gates 216. These gates pass the inverted negative-going verification pulses 218 from their associated input leads 210 only when they coincide with encoded inputs on their respective row address busses 70 and the gate leads 220. Thus the conducting and non-conducting "And" gates 216 sort out the generator pulses 203 to make the verification inputs 218 represent the compared data, just as the open and closed contacts 32 sort out the pulses 198 to make them represent the stored data. Capacitive coupling between the coils 40 and 42 is no problem because the low-capacitance "And" gates 216 serve the same function as the contacts 32 in preventing unwanted pulses from reaching the high-capacitance relay coils.

The matched verification pulses 198 and 218 are opposed in polarity. Because of the stranded winding technique, the primary coils 40 and 44 are wound in a common sense or winding direction. The vertification pulses 198 and 218 are applied to relay terminals 36 and 46 respectively (see FIGURES 3B and 4) both of which lead ultimately to the upper end of the trifilar winding, so that the pulses are injected in the same direction. Therefore, the opposite voltage polarities of the pulses 198 and 218 induce opposite output voltages in the secondary coil 42. Further, the circuit parameters are chosen in the conventional way so as to make the amplitudes of the pulses 198 and 218 equal, and the stranded winding method then inherently provides a 1:1 turns ratio between any two of the coils 40, 42, and 44 so as to equalize the induced voltages. The end result is that equal and opposite voltages are induced in the secondary coil 42 when pulses 218 and 198 are injected into primary coils 40 and 44 respectively. This produces a zero net output, which indicates a valid comparison. If no pulses are injected into either of the coils 40 and 44, once again the absence of an output on the coil 42 indicates a valid comparison.

If only one of the coils 40 or 44 of a relay 20 has a pulse 218 or 198 injected thereinto, it will couple an uncancelled output pulse into the secondary coil 42 of that relay. This output is the non-comparison indication. The polarity of this output depends upon which one of the two opposed inputs 198 or 218 is present, so that either polarity must be interpreted as signifying non-comparison. Rectification of the output is therefore employed to achieve insensitivity to polarity. The non-compare output voltage at the upper terminal 50 of the coil 42 is applied over the associated column bus 60 and commutator segment 64 to the commutator arm 66, and then to a double-throw function-selector switch 230 which is connectable to the column select lead 138 for write-in purposes or to a non-compare output lead 232 for verification purposes. In the latter position of the switch, the output goes over the lead 232 through a diode rectifier bridge 234 which always applies the same polarity signal over a connecting lead 236 to a conventional pulse detector amplifier 238. The amplified output of the pulse detector 238 is then applied to a read-out terminal to which any conventional device may be connected for utilizing the non-comparison signal. The input to the pulse detector 238 must return to ground through a return lead 240 and the bridge 234. The lower terminal 52 of the coil 42 is likewise returned to ground as seen in FIGURE 3B to complete the circuit of the non-comparison output.

To use the circuit of FIGURE 9 for verification, the data is first set into the memory over the row and column busses 70 and 60 respectively, with the switches 212 connected to their respective leads 70 and the switch 230 connected to the lead 138. Then to compare additional data with that just written into the memory, these switches are moved to select the leads 214 and 232 respectively. The commutator arm 66 is then set on the segment 64.1 to read the first column. Then, as the sequential trigger 208 probes the 1st through *m*th row positions in sequence, the first column of compared data is applied in encoded form to the busses 70. The output of a card or tape reader would normally present the memory matrix with an entire column of data in bit parallel form, i.e. all the various row inputs applied to the row busses 70 at the same time. These row inputs are maintained during an entire cycle of the sequential trigger 208, during which the first through *m*th row inputs are passed in succession by the "And" gates 216 as the trigger 208 scans down the column. The cycle of an electronic trigger may be initiated by a sprocket pulse from the card or tape reader, or alternatively if the mechanical scanning switch of FIGURE 7 is used it may be driven from the card-advance or tape-advance drive shaft of the reader for mechanical synchronization therewith. After the scan of the first column is completed, the commutator arm 66 is indexed and a similar scan is performed for all the other rows in succession. Here again, the utilization device connected to the read-out terminal of the pulse detector 238 must receive a running count of the column and row position, in the manner suggested above, as a means of identifying the address from which a non-comparison output originates.

While what has been shown and described above is believed to be the best mode and preferred embodiment of the invention, modifications and variations may be made therein without departing from the spirit of the invention as will be clear to those skilled in the art. Accordingly, the scope of the invention is intended to be limited solely by the appended claims.

The embodiments of the invention in which an exclusive property or privilege is claimed are defined as follows:

1. A memory comprising: a plurality of relays arranged in a multi-coordinate memory array wherein lines of said relays extending along different coordinates intersect to define memory addresses for the respective relays; each of said relays storing information and including respective latching coils and pairs of address coils; leads arranged for simultaneous access to the latching coils of, and leads arranged for simultaneous access to one of said pair of address coils of, respective relays along individual lines of said array extending along one of said coordinates; leads arranged for simultaneous access to the other of said pair of address coils of respective relays along individual lines of said array extending along another of said coordinates; means for probing individual relays along at least one selected line extending along a first one of said coordinates, by applying a first pulse to at least one first-coordinate-connected coil of said individual relays; said probe first-coordinate-connected coil being in inductive relationship with a second-coordinate-connected coil of respective relays to induce a second pulse therein in response to said first pulse, said first and second-coordinate-connected coils, means connected to said second-coordinate-connected coils of relays along at least one selected second-coordinate line to detect pulses induced therein; and a pair of relay contacts connected in series with said latching coils of said relays and representing by their open or closed condition the information stored in those relays whereby the pulses passed through said contacts represent the information stored by those relays.

2. A memory comprising: a plurality of relays arranged in a multi-coordinate memory array wherein lines of said relays extending along different coordinates intersect to define memory addresses for the respective relays; each of said relays storing information and including respective latching coils and pairs of address coils; leads arranged for simultaneous access to the latching coils of, and leads arranged for simultaneous access to one of said pair of address coils of, respective relays along individual lines of said array extending along one of said coordinates; leads arranged for simultaneous access to the other of said pair of address coils of respective relays along individual lines of said array extending along another of said coordinates; probing means for probing individual relays along at least one selected line extending along a first one of said coordinates, by applying a first pulse to a least one first-coordinate-connected coil of said individual relays; said probed first-coordinate-connected coil being in inductive relationship with a second-coordinate-connected coil of respective relays to induce a second pulse therein in response to said first pulse, means connected to said second-coordinate-connected coils of relays along at least one selected second-coordinate line to detect pulses induced therein; and means coupled to said probing means for applying one of said first and second pulses to at least one of said coils of said inductively related pair only of certain relays according to the information stored by said certain relays.

3. A memory comprising: a plurality of relays arranged in a multi-coordinate memory array wherein lines of said relays extending along different coordinates intersect to define memory addresses for the respective relays; each of said relays storing information and including respective latching coils and pairs of address coils; leads arranged for simultaneous access to the latching coils of, and leads arranged for simultaneous access to one of said pair of address coils of, respective relays along individual lines of said array extending along a first one of said coordinates; leads arranged for simultaneous access to the other of said pair of address coils of respective relays along individual lines of said array extending along a second one of said coordinates; means for probing individual relays along at least one selected line extending along said first coordinate, by applying a first pulse to said latching coil of said indivdual relays; said latching coil being in inductive relationship with one of the address coils of respective relays to induce a second pulse therein in response to said first pulse, means connected to said one of said address coils of relays to detect pulses induced therein; and a pair of relay contacts connected in series with said latching coil of each of said relays and representing by their open or closed condition the respective bits of information stored in those relays whereby pulses passed through said contacts to said latching coils to be induced in said one of said address coils represent the information stored by those relays.

4. A memory comprising: a plurality of relays arranged in a multi-coordinate memory array wherein lines of said relays extending along different coordinates intersect to define memory addresses for the respective relays; each of said relays storing information and including respective latching coils and pairs of address coils; leads arranged for simultaneous access to the latching coils of, and leads arranged for simultaneous access to one of said pair of address coils of, respective relays along individual lines of said array extending along a first one of said coordinates; leads arranged for simultaneous access to the other of said pair of address coils of respective relays along individual lines of said array extending along a second one of said coordinates; probing means for probing individual relays along at least one selected line extending along said first coordinate, by applying a first pulse to said latching coils of said individual relays; said latching coil being in inductive relationship with the second-coordinate-connected address coil of respective relays to induce a second pulse therein in response to said first pulse, means connected to said second-coordinate-connected address coils of the relays along at least one selected second-coordinate line to detect pulses induced therein; and a pair of relay contacts connected in series with said probing means and said latching coil of each of said relays and representing by their open or closed condition the information stored in those relays whereby said first pulses passed through said contacts to said latching coils to be induced in said second-coordinate-connected address coils represent the information stored by those relays.

5. A memory comprising: a plurality of relays arranged in a multi-coordinate memory array wherein lines of said relays extending along different coordinates intersect to define memory addresses for the respective relays; each of said relays storing information and including respective latching coils and pairs of address coils; leads arranged for simultaneous access to the latching coils of, and leads arranged for simultaneous access to one of said pair of address coils of, respective relays along individual lines of said array extending along a first one of said coordinates; leads arranged for simultaneous access to the other of said pair of address coils of respective relays along individual lines of said array extending along a second one of said coordinates; means for probing individual relays along at least one selected line extending along said second coordinate, by applying a first pulse to said second-coordinate-connected address coils of said individual relays; said second-coordinate-connected address coil being in inductive relationship with the latching coil of respective relays whereby to induce a second pulse therein in response to said first pulse, means connected to said latching coils of relays along at least one selected first-coordinate line of memory addresses to detect pulses induced therein; and a pair of relay contacts connected in series with said latching coil of each of said relays and representing by their open or closed condition the information stored in those relays whereby the pulses passed through said contacts from said latching coils represent the information stored by said relays.

6. A memory as in claim 1, adapted for serial readout, wherein: said probing means is arranged to probe a succession of first-coordinate lines in sequence; and said detecting means is arranged to read out from a succession of second coordinate lines in sequence, one such line for each first-coordinate probe sequence.

7. A memory as in claim 1, adapted for parallel readout, wherein: said probing means is arranged to probe a succession of first-coordinate lines in sequence; and a plurality of said detecting means are arranged to read out simultaneously from a plurality of second-coordinate lines.

8. A memory comprising: at least one relay; said relay including at least one set coil adapted to participate in closing the relay and a latching coil connected to hold the relay closed; means for applying a pulse to a first one of said coils; said coils being in inductive relationship whereby said first coil induces a pulse in a second one of said coils; and means connected to said second coil to detect pulses induced therein; said relay including a pair of contacts connected in series with said latching coil and representing by their open or closed condition the information stored in said relay whereby the pulses passed through said contacts represent that information.

9. A memory as in claim 6 wherein the probing means comprises: a latch supply; individual latch supply busses for the respective first-coordinate lines of said array; individual control transistors connected to control the respective latch supply currents on said busses; individual leads connected to control said respective transistors; a voltage regulator connected across said latch supply and connected to said control leads to regulate the latch supply by means of said control transistors; individual pulse transistors connected to gate the signal on respective ones of said control leads; individual leads connected to control respective ones of said pulse transistors; individual pulse generators connected to respective ones of said pulse transistor control leads and adapted to apply thereto respective pulses affecting said pulse transistors in a manner to reduce momentarily the latch supply current through said control transistors; and means for triggering successive ones of said pulse generators in sequence whereby to probe said first-coordinate lines consecutively.

References Cited

UNITED STATES PATENTS

| | | | |
|---|---|---|---|
| 2,995,637 | 8/1961 | Feiner et al. | 200—102 |
| 3,042,900 | 7/1962 | Werts | 340—168 |
| 3,053,938 | 9/1962 | Nitsch | 335—152 |
| 3,088,056 | 4/1963 | Tevonian | 317—134 |
| 3,134,867 | 5/1964 | Winship | 335—153 |
| 3,134,908 | 5/1964 | Ellwood | 340—173 |
| 3,183,487 | 5/1965 | Deeg | 340—166 |
| 3,188,423 | 6/1965 | Gleener et al. | 179—27.54 |
| 3,217,122 | 11/1965 | Bernstein | 340—174 |

ROBERT C. BAILEY, *Primary Examiner.*

J. P. VANDENBURG, *Assistant Examiner.*

UNITED STATES PATENT OFFICE

CERTIFICATE OF CORRECTION

Patent No. 3,348,206 October 17, 1967

Hugh St. L. Dannatt

It is hereby certified that error appears in the above numbered patent requiring correction and that the said Letters Patent should read as corrected below.

Column 14, line 5, for "coils," read -- coils of each of said relays including said latching coil, --; line 57, for "indivdual" read -- individual --.

Signed and sealed this 26th day of November 1968.

(SEAL)

Attest:

Edward M. Fletcher, Jr.

Attesting Officer

EDWARD J. BRENNER

Commissioner of Patents